Figure 1:
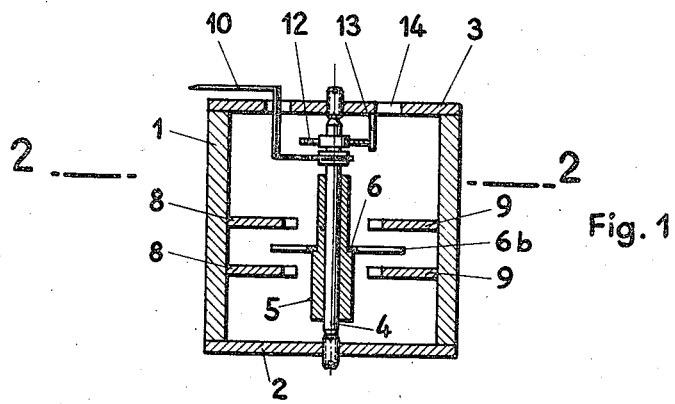

Feb. 18, 1958   R. KELLER   2,824,246
INSTRUMENT FOR MEASURING A VACUUM
Filed May 9, 1955

INVENTOR.
Robert Keller

United States Patent Office 2,824,246
Patented Feb. 18, 1958

2,824,246
INSTRUMENT FOR MEASURING A VACUUM

Robert Keller, Geneva, Switzerland, assignor to Gerätebau-Anstalt Balzers, a company of Liechtenstein Application May 9, 1955, Serial No. 507,044

Claims priority, application Switzerland May 19, 1954

11 Claims. (Cl. 313—54)

The present invention relates to an instrument for measuring a vacuum, the latter being referred to as a vacuum manometer hereinafter.

It is known that an electrode which is covered by a thin layer of a radioactive element can be charged electrically by the α- or β-rays emitted. When for example the electrons of a β-radiation emerge from the radioactive substance of a thin layer applied to an electrode, and are caught by a counter-electrode, then the radioactive substance and the electrode connected to it are charged up positively owing to the loss of electrons, while the counter-electrode which catches the electrons receives a negative charge.

It is known moreover that the radioactive radiation is capable of making the ambient atmosphere more or less electrically conductive by ionisation.

The vacuum manometer according to the invention constitutes an application of the aforesaid principles. The electric conductivity imparted to the ambient atmosphere by the radioactive radiation counteracts the electrostatic charging up of the electrode in such a maner that the state of charging eventually reached represents a function of the pressure of the ambient atmosphere.

It is an object of the present invention to provide an instrument for the continuous electrical measurement of vacuum which can be operated independently of external sources of current or voltage.

A further object of the present invention consists in providing an electric vacuum manometer which dispenses with an electronic amplifier for its operation.

A further object of the present invention is to provide a small and handy vacuum manometer which owing to its small requirements of space can be built into a vacuum recipient at any point.

With these and other objects in view I provide a vacuum manometer adapted to be fitted into a recipient containing a rarified gas, comprising in combination: electrodes of opposite polarity arranged in juxtaposition to and electrically insulated from one another, a radioactive substance conductively connected to one of the said electrodes and emitting radioactive radiation into the said rarified gas, and measuring means metering the electrostatic potential difference between the said electrodes establishing an equilibrium between the charging effect of the radioactive radiation of the said substance and the discharging effect of the ionisation caused by the said radiation as a measure for the pressure of the said rarified gas.

More particularly the vacuum manometer according to the invention may have for example the following features: in the recipient containing the rarified gas the pressure of which is to be metered, at the point where the said pressure is to be ascertained an electrode e. g. a small metal plate is mounted electrically insulated, which plate is coated with a radioactive preparation, preferably in a thin layer. Radioactive substances having a long radioactive period are particularly suitable, for example strontium 90 which has a radioactive period of 20 years and which does not emit any gamma rays detrimental to health and accordingly does not require any special protective means against γ-radiation.

In juxtaposition to this insulated electrode one or more counter-electrodes are mounted, for example in the form of metal plates, with the object of catching the charged particles emitted by the radioactive preparation. Thus one of the electrodes is charged positively, the other negatively so that a potential difference between the electrodes is set up.

Since the ambient atmosphere is at the same time made more or less electrically conductive by the radioactive radiation depending on the pressure prevailing, the electric potential difference lying across the said electrodes effects a gas discharge depending on the said pressure whereby the electrodes charged by the radioactive particles tend to discharge themselves again.

From the opposed actions of radioactive charging and pressure-responsive discharging by ionisation an equilibrium voltage results on the electrodes which becomes the larger the lower the presure is in the vacuum chamber. At very low pressures of for example $10^{-4}$ millimeters Hg the radioactive charging still acts at full force, while the ionisation and the gas discharge diminish. Equilibrium is established when owing to the ever increasing potential difference the gas discharge between the electrodes assumes such an intensity, that the current intensity of the gas discharge is just equal to the current intensity which corresponds for example to an oppositely directed electron emission from the radioactive preparation.

For the purpose of measuring the pressure according to the method according to the invention the equilibrium voltage establishing itself between the electrodes is metered preferably by means of an electrostatic voltage meter. The dependence of the voltage generated from the pressure and kind of gas selected is ascertained by means of calibrating manometer, and varies according to the position of the electrodes. After the instrument according to the invention has been calibrated by means of another manometer, it can serve for the accurate measurement of pressures, and offers the great advantage, that a continuous reading of the magnitude of pressure is possible, and that no external sources of current or voltage are required for supplying the instrument. It is advantageous for the measuring of the voltage to construct the aforesaid electrodes themselves as an electrostatic voltage metering instrument.

Figure 2:
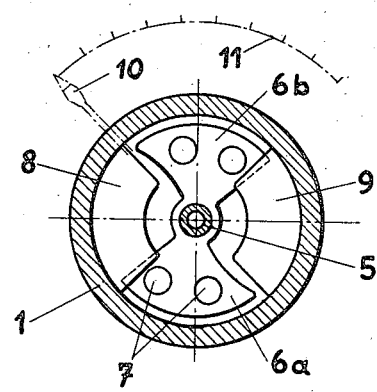
Figure 3:
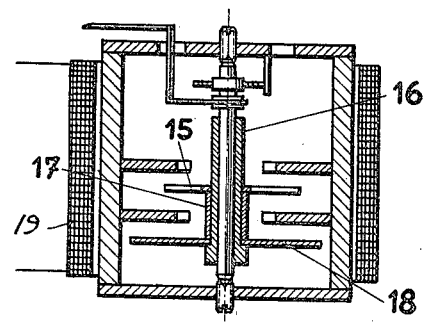

These and other objects and features will be clearly understood from the following description of a vacuum manometer according to my said invention given by way of example with reference to the accompanying drawing in which:

Fig. 1 is an axial section of one embodiment of the vacuum manometer according to the invention, Fig. 2 is a section along the line 2—2 of Fig. 1, Fig. 3 is an axial section of a modified embodiment of the invention.

Referring first to the embodiment according to Figs. 1 and 2, the vacuum manometer has a casing including a cylindrical shell 1 closed by two end plates or covers 2 and 3. Between the two end plates 2 and 3 a shaft 4 is journalled rotatably. The said shaft 4 carries an insulating sleeve 5 on which a movable armature 6 is mounted. The latter consists of two vanes 6a and 6b which have perforations 7. The vanes 6a, 6b can move between pairs of stationary plates 8 and 9, which are mounted in the interior of the casing 1, and form stationary pairs of electrodes.

The movable electrode vanes 6a, 6b are coated with a thin layer of a radioactive substance—preferably of strontium 90—which has the object of imparting an electric charge to the movable armature 6 relative to the stationary armature 8—9. In the case of the use of a β-ray emitter the movable electrode accordingly receives a positive charge, whereas the stationary electrodes receive a negative charge.

The charging is limited by the electric conductivity generated in the rarified atmosphere by the ionisation owing to the radioactive radiation, the electrical conductivity depending in turn on the pressure of the gas. The electric charge effects by electrostatic forces an angular deflection of the movable armature 6 and accordingly a turning of the shaft 4. The latter carries a pointer 10 which plays over a scale 11 which may be calibrated directly in pressure units.

A spiral spring 12 the outer end of which is attached to the plate 3 at 13 and the inner end of which is connected to the shaft 4, counteracts any rotation of the shaft 4 and tends to retain the pointer 10 in its rest position.

The manometer according to the invention can be arranged directly on that place of a vacuum recipient (not shown) where the pressure is to be ascertained. For this purpose the plate 3 is provided with apertures so that the pressure in the interior of the manometer casing 1, 2, 3 corresponds to the pressure in the evacuated chamber in which the manometer is located.

The manometer according to the invention is particularly suitable for the measuring of pressures between $10^{-1}$ and $10^{-4}$ millimetres Hg. For pressures lower than $10^{-4}$ the voltage, at which the movable armature 6 can be charged relative to the stationary armature, becomes very high so that in certain circumstances uncontrollable creep currents along the insulating sleeve 5 may occur which would falsify the measurement, unless certain additional arrangements are made as will be described later.

In order to establish well defined technical conditions of measurement, the insulating sleeve may be given from the outset a certain very low electric conductivity in that for example an insulating material having a low electric conductivity is used for the sleeve, or in that on to the surface of the insulator a thin layer of an electrically conductive material is precipitated from the vapour phase in a vacuum.

From Fig. 2 which represents a section along the line 2—2 of Fig. 1, the shape of the movable vane electrodes and of the stationary electrodes vanes is visible. The stationary pairs of electrodes 8 and 9 have for example in this case the shape of annular segments. The vanes 6a and 6b of the movable electrode 6 are turned more or less deeply into the interstices between the stationary electrodes depending on the potential difference across the electrodes, in the manner of an electrostatic voltage meter.

In another embodiment of the invention which is illustrated in Fig. 3, movable vane electrodes 15 are provided which are connected to a metal sleeve 17, carried in turn by an insulating sleeve 16. The metal sleeve 17 carries also an annular plate 18 which is located below the stationary electrodes 8 and 9. In this embodiment of the invention only the plate 18 is coated with a radioactive layer, but not the movable electrode vanes proper 15. The annular plate 18 provided with a radioactive coating is, however, conductively connected to the electrode 15 through the metal sleeve 17. Otherwise there is the same arrangement as according to Fig. 1.

The arrangement according to Fig. 3 offers the advantage that the radioactive layer on the annular plate 18 is always at the same distance and under geometrically constant electric field conditions, in juxtaposition to the lower electrodes 8 and 9, which are conductively connected to the casing, whereas in the embodiment according to Fig. 1 the radioactive layer on the two vane electrodes 6a, 6b is sometimes within the stationary electrodes, sometimes outside thereof, depending on the rotational position of the shaft 4, so that the electric field conditions and consequently the discharge vary in accordance with the position of the movable vane electrodes.

The range of measuring of the manometer according to the invention can be readily extended to pressures below $10^{-5}$ without the occurrence of unduly high voltages, if a magnetic field is provided which stands perpendicular to the plane of the electrodes, i. e. parallel to the axis of rotation. The simplest way is to make the said cylindrical shell 1 itself a permanent magnet. Alternatively a solenoid 19 (Fig. 3) may be placed round the said cylindrical shell 1. The electrons generated by ionisation can pass through the apertures 7 of the movable electrode vanes, and oscillate between the two stationary electrode plates, similar to a Penning-ionisation manometer. This magnetic field has the effect that the paths of the electrons are extended and that accordingly a stronger ionisation effect and stronger discharge current occur, so that even at pressures below $10^{-5}$ millimetres Hg no unduly high potential differences can occur between the electrodes.

It is of course possible to replace the permanent magnet by an electromagnet which may for example be constituted by a coil arranged around the casing 1.

While I have herein described and illustrated in the accompanying drawing what may be considered typical and particularly useful embodiments of my said invention I wish it to be understood that I do not limit myself to the particular details and dimensions described and illustrated, for obvious modifications will occur to a person skilled in the art.

What I claim as my invention and desire to secure by Letters Patent is:

1. A vacuum manometer adapted to be fitted into a recipient containing a rarified gas and comprising in combination: electrodes of opposite polarity arranged in juxtaposition to and electrically insulated from one another, a radioactive substance conductively connected to one of the said electrodes and emitting radioactive radiation into the said rarified gas, and measuring means metering the electrostatic potential difference between the said electrodes establishing an equilibrium between the charging effect of the radioactive radiation of the said substance and the discharging effect of the ionisation caused by the said radiation as a measure for the pressure of the said rarified gas.

2. A vacuum manometer comprising in combination: a casing including a cylindrical shell and two end covers adapted to contain a rarified gas, a scale arranged on the outer face of one of the said covers, a shaft rotatably journalled between the said end covers, a pointer mounted on the said shaft and playing over the said scale, a pair of vane electrodes mounted on the said shaft in a plane perpendicular to the axis thereof, pairs of stationary electrodes mounted in the said casing insulated from and in juxtaposition to the said vane electrodes and a radioactive substance conductively connected to one pair of the said electrodes and emitting radioactive radiation into the interior of the said casing, and resilient biasing means tending to restore the position of the said shaft relative to the said casing to a rest position, the radioactive radiation of the said substance on the one hand setting up a potential difference between the said stationary electrodes and vane electrodes and applying thereby an electrostatic torque to the said shaft tending to rotate the same against the said biasing means, and on the other hand ionising the space between the said stationary electrodes and vane electrodes tending to discharge the said potential difference, the said pointer indicating on the said scale the equilibrium value of the said potential difference established between the said charging and discharging effects of the said radioactive radiation depending on the pressure of the said rarified gas.

3. A vacuum manometer as claimed in claim 2 wherein the said radioactive substance forms a thin coating on one of the said pairs of electrodes facing the pair of electrodes electrically insulated therefrom.

4. A vacuum manometer as claimed in claim 2, comprising an insulating sleeve surrounding the said shaft and carrying the said vane electrodes.

5. A vacuum manometer as claimed in claim 2, comprising a sleeve having a predetermined very low electric conductivity surrounding the said shaft and carrying the said vane electrodes.

6. A vacuum manometer as claimed in claim 2, comprising a sleeve of insulating material and coated with a very thin conductive layer of predetermined conductivity, the said sleeve surrounding the said shaft and carrying the said vane electrodes.

7. A vacuum manometer as claimed in claim 2, wherein the said radioactive substance is strontium 90.

8. A vacuum manometer as claimed in claim 2 comprising in addition: a conductive sleeve surrounding the said insulating sleeve and conductively connected to the said movable vane electrodes, and an annular plate arranged on the said conductive sleeve in juxtaposition to the side of one pair of the said stationary electrodes facing away from the said movable vane electrodes, the said radioactive substance forming a layer on the side of the said annular plate adjacent the said pair of stationary electrodes.

9. A vacuum manometer as claimed in claim 2, comprising magnetic means setting up a magnetic field perpendicular to the planes of the said opposed electrodes and influencing the gas discharge between the same.

10. A vacuum manometer as claimed in claim 9, wherein the said magnetic means are constituted by the said cylindrical shell forming a permanent magnet having a field perpendicular to the planes of the said opposed electrodes and influencing the gas discharge between the same.

11. A vacuum manometer as claimed in claim 9 wherein the said movable vane electrodes have perforations for the passage of electrons and gas ions produced by the said radioactive radiation and influenced by the said magnetic field.

No references cited.